(12) United States Patent (10) Patent No.: US 12,632,994 B2
Gruen (45) Date of Patent: May 19, 2026

(54) LOSSY GEOMETRY COMPRESSION USING INTERPOLATED NORMALS FOR USE IN BVH BUILDING AND RENDERING

(71) Applicant: Advanced Micro Devices, Inc., Santa Clara, CA (US)

(72) Inventor: Holger Gruen, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 197 days.

(21) Appl. No.: 18/475,949

(22) Filed: Sep. 27, 2023

(65) Prior Publication Data

US 2025/0104285 A1 Mar. 27, 2025

(51) Int. Cl.
*G06T 9/00* (2006.01)
*G06T 3/4007* (2024.01)
*G06T 15/06* (2011.01)
*G06T 17/20* (2006.01)

(52) U.S. Cl.
CPC ............ *G06T 9/001* (2013.01); *G06T 3/4007* (2013.01); *G06T 15/06* (2013.01); *G06T 17/20* (2013.01); *G06T 2210/21* (2013.01); *G06T 2210/56* (2013.01)

(58) Field of Classification Search
CPC ....... G06T 9/001; G06T 3/4007; G06T 15/06; G06T 17/20; G06T 2210/21; G06T 2210/56
See application file for complete search history.

(56) References Cited

U.S. PATENT DOCUMENTS

| | | | |
|---|---|---|---|
| 2021/0295589 A1 | 9/2021 | Zhdan et al. | |
| 2022/0189096 A1 | 6/2022 | Wu et al. | |
| 2022/0392023 A1 | 12/2022 | Wolfe | |
| 2022/0392179 A1* | 12/2022 | Munkberg | G06T 19/20 |
| 2023/0078932 A1* | 3/2023 | Burgess | G06T 15/06 |
| | | | 345/420 |

(Continued)

FOREIGN PATENT DOCUMENTS

| CN | 1499447 A | * | 5/2004 | G06T 17/30 |
|---|---|---|---|---|

OTHER PUBLICATIONS

Maggiordomo et al: Micro-Mesh Construction [online] [Retrieved Jun. 23, 2025] <URL: https://d1qx31qr3h6wln.cloudfront.net/ publications/MicroMesh_generation.pdf> (Year: 2023).*

(Continued)

*Primary Examiner* — King Y Poon
*Assistant Examiner* — Vincent Alexander Providence
(74) *Attorney, Agent, or Firm* — Volpe Koenig

(57) ABSTRACT

Devices and methods for rendering objects using ray tracing are provided which include generating a low resolution version of a high resolution mesh representing objects in the scene, determining points on curved surfaces of curved surface patches defined for one of triangles and bi-linear quadrangles of the low resolution version of the high resolution mesh, performing ray intersection testing by casting rays toward surfaces of the high resolution mesh which are approximated from new points calculated by offset values along interpolated normals from the points on the curved surfaces of the curved surface patches and rendering the objects in the scene based on the ray intersection testing.

20 Claims, 8 Drawing Sheets

(56) References Cited

U.S. PATENT DOCUMENTS

2023/0118937 A1    4/2023  Csefalvay et al.

OTHER PUBLICATIONS

Stanford: The Stanford 3D Scanning Repository [online] [Retrieved Jun. 16, 2025] <URL: https://graphics.stanford.edu/data/3Dscanrep/# uses> (Year: 2023).*

Polycount Wiki: Polygon Count [online] [Retrieved Jun. 18, 2025] <URL: http://wiki.polycount.com/w/index.php?title=Polygon_Count &oldid=8907> (Year: 2021).*

Maggiordomo et al: Micro-Mesh Construction [online] [Retrieved Jun. 23, 2025] <URL: https://d1qx31qr3h6wln.cloudfront.net/publications/MicroMesh_generation.pdf> (Year: 2023).*

Blender Documentation Team: Triangles to Quads [online] [Retrieved Jun. 18, 2025] <URL: https://web.archive.org/web/20220707200450/https://docs.blender.org/manual/en/latest/modeling/meshes/editing/face/triangles_quads.html#triangles-to-quads> (Year: 2022).* cgcookie.com: Big Idea: "Baking" [online] [Retrieved Jun. 18, 2025] <URL: https://cgcookie.com/posts/big-idea-baking> (Year: 2016).*

DiagSplit: Parallel, Crack-free, Adaptive Tessellation for Micropolygon Rendering [online] [Retrieved Dec. 18, 2025] <URL: https://dl.acm.org/doi/pdf/10.1145/1618452.1618496> (Year: 2009).*

* cited by examiner

Figure 5:
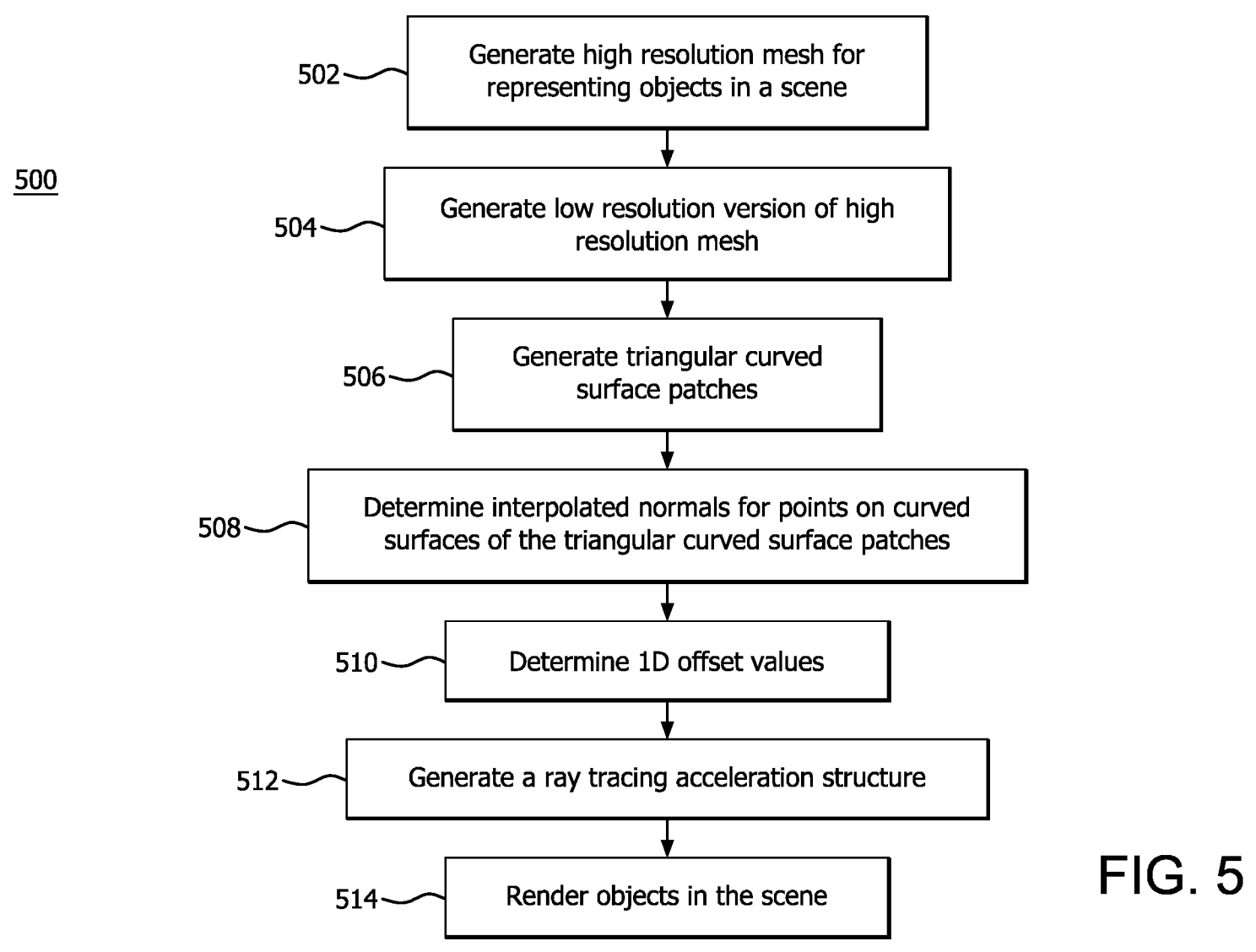

502 — Generate high resolution mesh for representing objects in a scene

504 — Generate low resolution version of high resolution mesh

506 — Generate triangular curved surface patches

508 — Determine interpolated normals for points on curved surfaces of the triangular curved surface patches 510 — Determine 1D offset values 512 — Generate a ray tracing acceleration structure 514 — Render objects in the scene

800

LOSSY GEOMETRY COMPRESSION USING INTERPOLATED NORMALS FOR USE IN BVH BUILDING AND RENDERING

BACKGROUND

Ray tracing is a type of graphics rendering technique in which simulated rays of light are cast to test for object intersection and pixels are illuminated and colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein:

FIG. 5 is a flow diagram illustrating an example method of rendering objects in a scene using ray tracing according to features of the present disclosure;

DETAILED DESCRIPTION

Figure 1:
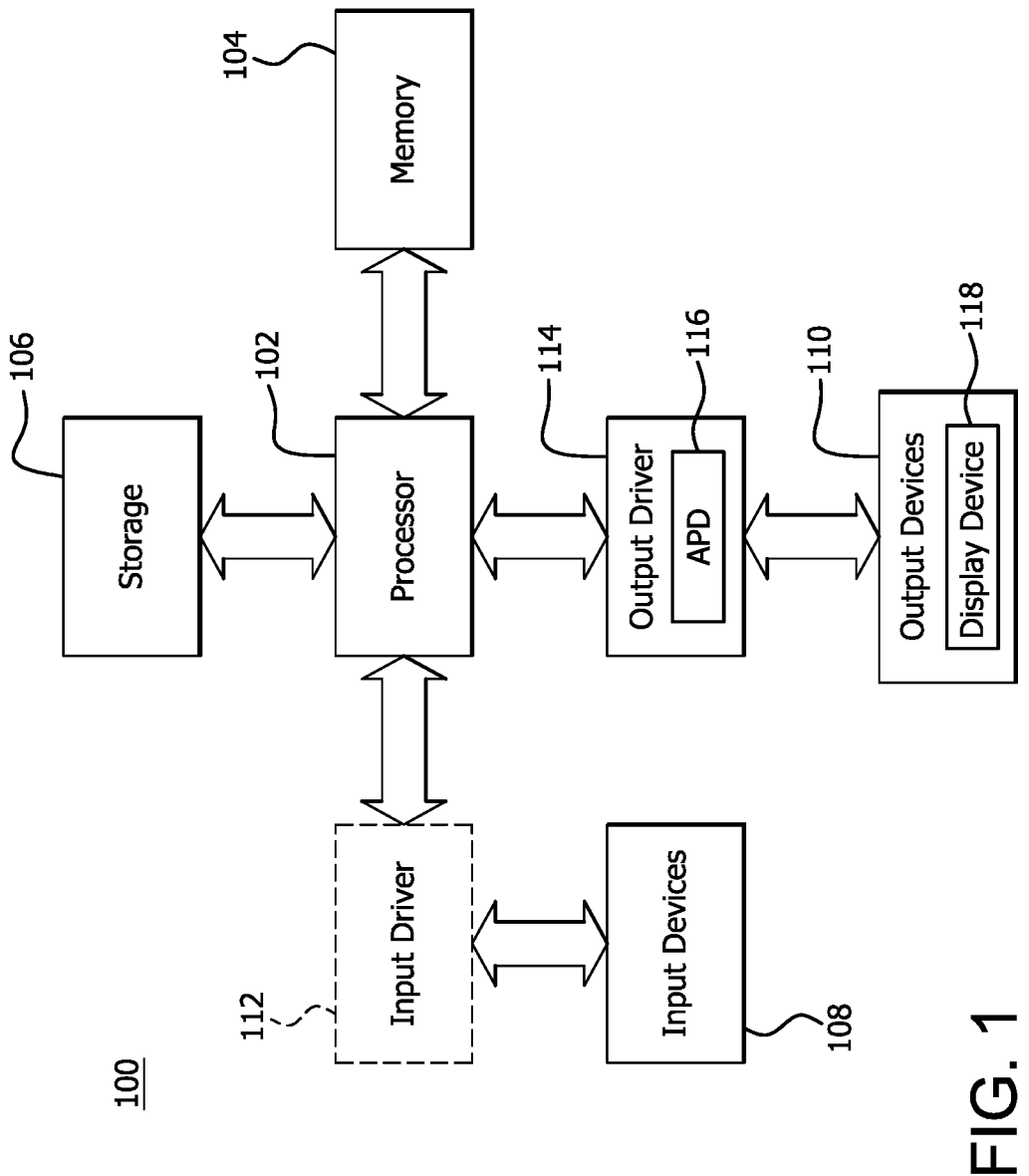
FIG. 1 is a block diagram of an example device in which one or more features of the disclosure can be implemented.

As described above, each ray intersection test is complex and expensive in terms of processing resources. Accordingly, accelerated hierarchy structures, such as a bounding volume hierarchy (BVH) are used to implement ray tracing more efficiently to make accurate determinations. While an accelerated hierarchy structure (e.g., a BVH structure) implements ray tracing more efficiently, a large amount of data is often used to represent each primitive (e.g., each node) of the BVH structure and, therefore, a large amount of memory is consumed to implement the BVH structure for ray tracing. In fact, the BVH data used to represent more complex scenes is typically too large to fit into the memory of an accelerated processor (e.g., GPU).

Some conventional techniques have attempted to reduce the amount of data stored for a high resolution mesh (e.g., data representing the triangles of a BVH structure) by compressing a portion of a high resolution mesh as quantized 3D offsets (i.e., displacement vectors) between points on a low resolution mesh (representing the portion of the high resolution mesh) and points on a bi-linear interpolated surface (i.e., the base surface defined by four vertices). That is, because the low resolution mesh includes a smaller number of triangles than the high resolution mesh, less connectivity data (e.g., vertex data of the triangles) is used (e.g., stored in memory) to represent the triangles of the BVH structure. Rays are then cast at locations determined from the quantized 3D offsets. While these conventional techniques do reduce the amount of data stored, the compression ratios of these conventional techniques are inefficient (i.e., low) because they require storing the values of each of the offsets in all three dimensions.

Other conventional techniques which convert the high resolution mesh to a low resolution mesh have attempted to achieve higher compression ratios by using the direction of normals of subdivision (e.g. Loop subdivision) surfaces of flat triangles of the lower resolution mesh as the directions along which to encode one dimensional (1D) offsets (in contrast to encoding offsets in three dimensions). The 1D offsets are applied from a point on each subdivided surface (i.e., surface that is C1 continuous across a base of a triangle of the lower resolution mesh) and along the normal of the subdivided surface.

That is, in order to accurately cast rays at surfaces represented by the high resolution mesh, the differences between the LR mesh and the HR mesh are determined from the 1D offsets. However, although these conventional 1D offset techniques achieve higher compression ratios than the techniques which compress the meshes as 3D offsets, determining these differences requires evaluating each of the subdivided surfaces, which includes evaluating the data (e.g., storing the data in memory and reading the data from memory) of the vertices (e.g., valences of the vertices) of neighboring triangles (i.e., triangles of other nodes of a BVH). Accordingly, this additional evaluation results in inefficient additional power and time consumption.

Further, some conventional 1D offset techniques use the surface normals of the flat triangles to determine the locations to cast the rays, which often results in large offset values. Accordingly, these large offset values require a large amount of memory (i.e., to store the bits representing the large offset values).

Features of the present disclosure provide apparatuses and methods for compressing surface geometry and rendering objects in a scene using ray tracing. Features of the present disclosure provide lossy compression techniques which reduce the amount of data stored for the geometry of a scene (thereby reducing the amount of memory used to store the data) while maintaining higher compression ratios than conventional techniques. The techniques described herein compress the data such that the geometry representing larger scenes (e.g., more complex scenes) is processed on an accelerated processor (i.e., processed using the memory of an accelerated processor, such as a GPU).

Features of the present disclosure generate a low resolution version (i.e., low resolution mesh) of a high resolution mesh (e.g., high resolution mesh of triangles or bi-linear quadrangles) representing objects in a scene. The low resolution mesh includes, for example, a smaller number of triangles or bi-linear quadrangles than the high resolution mesh. For each polygon, (e.g., a triangle or bi-linear quadrangle) of the low resolution mesh, a simple to evaluate (e.g., cost and time efficient) polygonal surface patch comprising a curved surface (e.g., a triangular surface patch, comprising a curved surface, defined over a triangular parameter space (hereinafter "triangular curved surface patch") or a bi-linear quadrangular surface patch comprising a curved surface defined over a bi-linear quadrangular parameter space (hereinafter "quadrangular curved surface patch") is generated for each corresponding triangle or bi-linear quadrangle of the low resolution mesh, in contrast to using subdivision surfaces with complicated evaluation schemes (e.g., expensive and less time efficient) or flat triangles implemented by some conventional techniques).

For simplified explanation purposes, examples described herein include using a triangular curved surface patch defined over a triangular parameter space. However, as described above, features of the present disclosure can be implemented using a different polygonal curved surface patch (e.g., a bi-linear quadrangular curved surface patch) defined over a different polygonal parameter space (e.g., a bi-linear quadrangular parameter space).

Interpolated normals (i.e., surface normals) are determined for points (e.g., locations) on the curved surface of the low resolution triangle mesh. Each interpolated normal also defines a direction at a corresponding point on the curved surface for a corresponding triangle. For each point on the curved surface, a one dimensional (1D) offset (e.g., a distance) value is determined between a corresponding point on the triangular curved surface patch and a surface of a triangle of the high resolution mesh. The offsets are determined by casting, from each point on the curved surface, a ray along a corresponding interpolated normal. Each ray is cast along the interpolated normal to determine the offset between a corresponding point on the curved surface and a surface of a triangle of the high resolution mesh. The 1D offsets between the curved surfaces and the high resolution triangles are stored and later used to render the objects in the scene.

An acceleration structure (e.g., BVH) is generated, which comprises the triangles of the low resolution mesh determined using the computed offsets, to reduce the number of primitives needed for BVH construction. For simplified explanation purposes, features of the present disclosure are described herein using BVHs as examples of hierarchy accelerated data structures. Features of the present disclosure can be implemented, however, for any type of hierarchy accelerated data structure used to represent objects (e.g., volume of objects) within a scene for implementing ray tracing.

The objects are rendered by, for each triangle, recomputing the points on the curved surface of each triangular curved surface patch, moving the points on the curved surface along the interpolated normal by the stored 1D offset values to new points on the surface of the high resolution mesh, creating new triangles of the high resolution mesh, based on the new points determined by the offsets which approximates the original high resolution surface and performing ray intersection testing by casting rays at these new triangles of the high resolution mesh which approximate the original high resolution surface. The objects are rendered based on the ray intersection testing.

In addition, because features of the present disclosure encode the differences (i.e., offsets) along interpolated normals starting from curved surfaces (i.e., curved surfaces of triangular surface patches), the stored offset values between the curved surfaces and surfaces of the triangles of the high resolution mesh have a lower magnitude than offset values of conventional techniques which encode differences along normals from points on flat triangles and, therefore, consume less memory than these conventional techniques. Further, features of the present disclosure encode the offsets without evaluating data (e.g., storing the data in memory and reading the data from memory) of vertices of neighboring triangles, resulting in less power and time consumption than conventional techniques.

A method for rendering objects in a scene using ray tracing is provided which comprises generating a low resolution version of a high resolution mesh representing objects in the scene, determining points on curved surfaces of curved surface patches defined for one of triangles and bi-linear quadrangles of the low resolution version of the high resolution mesh, performing ray intersection testing by casting rays toward surfaces of the high resolution mesh which are approximated from new points calculated by offset values along interpolated normals from the points on the curved surfaces of the curved surface patches, and rendering the objects in the scene based on the ray intersection testing.

A method for compressing geometry for rendering objects in a scene using ray tracing is provided which comprises generating a low resolution version of a high resolution mesh comprising at least one of triangles and bi-linear quadrangles representing objects in the scene. The method also includes, for one of a triangle and a bi-linear quadrangle of the low resolution mesh, generating a curved surface patch comprising a curved surface, determining interpolated normals at points on the curved surface of the curved surface patch by interpolating normals of the low resolution mesh and determining, for each of the points, an offset value as a distance from a point on the curved portion to a surface of the high resolution mesh. The method further comprises rendering objects in the scene, using a ray tracing acceleration structure, by casting rays toward the at least one of the triangles and the bi-linear quadrangles formed by the points on the curved surface, offset by the offset values along the interpolated normals, to new points on a surface approximating the high resolution mesh and performing ray intersection testing.

A processing device for rendering objects in a scene using ray tracing is provided which comprises memory and a processor. The processor is configured to generate a low resolution version of a high resolution mesh representing objects in the scene, determine points on curved surfaces of curved surface patches defined for one of triangles and bi-linear quadrangles of the low resolution mesh, perform ray intersection testing by casting rays toward surfaces of the high resolution mesh which are approximated from new points calculated by offset values along interpolated normals from the points on the curved surfaces of the curved surface patches and render the objects in the scene based on the ray intersection testing.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a display connector/interface (e.g., an HDMI or DisplayPort connector or interface for connecting to an HDMI or DisplayPort compliant device), a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
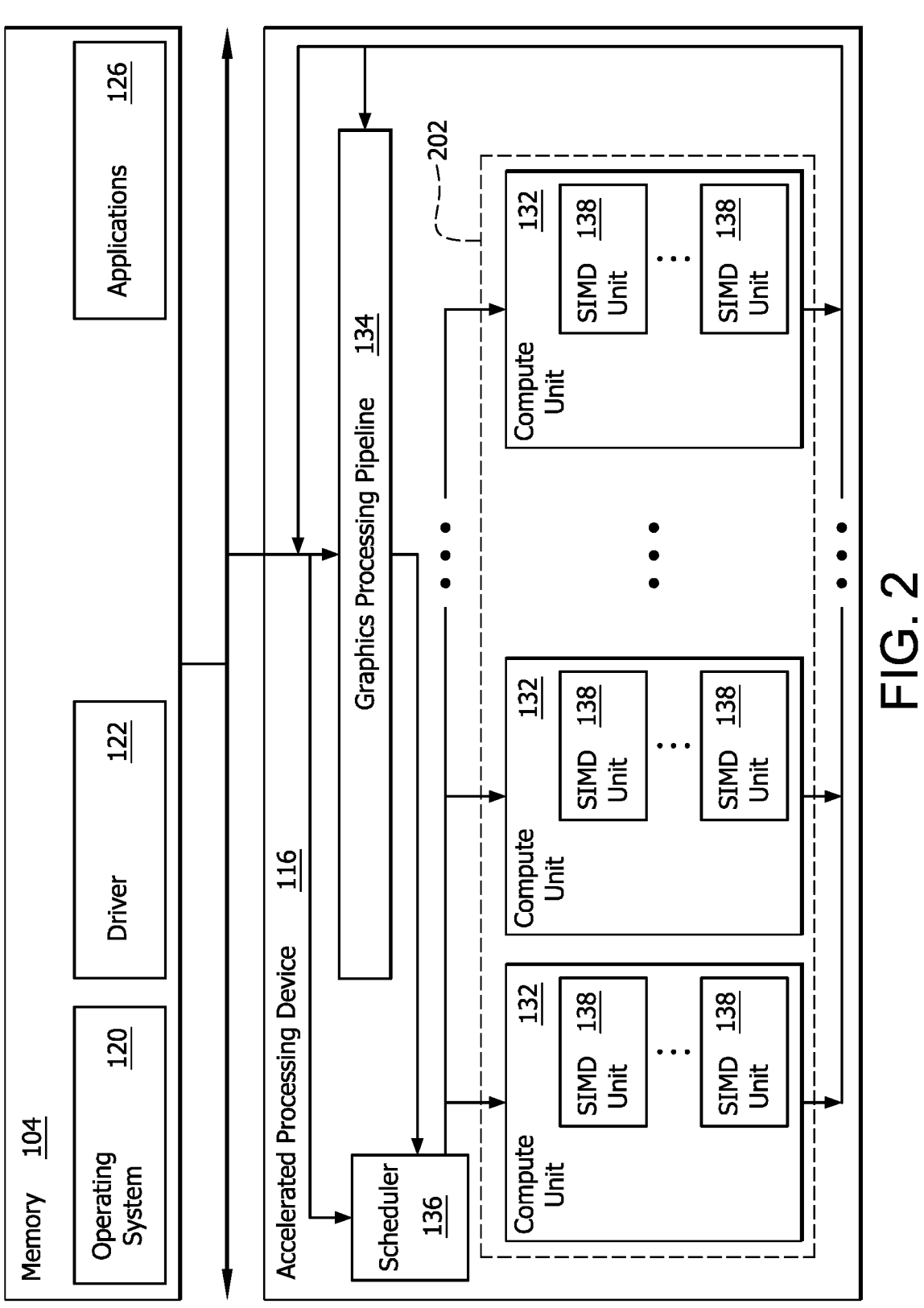
FIG. 2 is a block diagram of the device, illustrating additional details related to execution of processing tasks on the accelerated processing device of FIG. 1, according to an example.

FIG. 2 is a block diagram of aspects of device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (collectively "compute units 202") that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" (also "waves") on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations and non-graphics operations (sometimes known as "compute" operations). Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
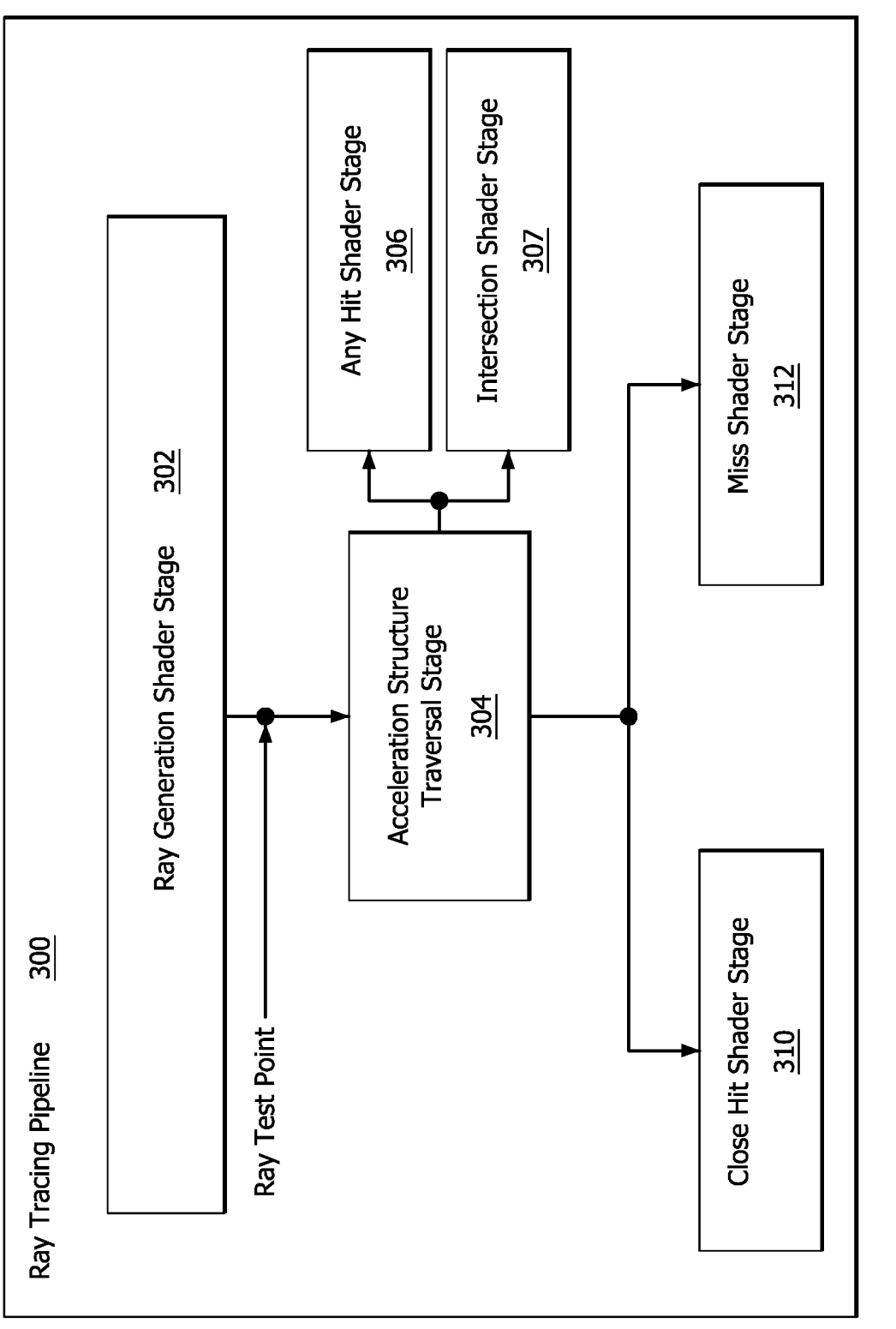
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are shader-implemented stages that represent ray tracing pipeline stages whose functionality is performed by shader programs executing on the SIMD unit 138. Any of the specific shader programs at each particular shader-implemented stage are defined by application-provided code (i.e., by code provided by an application developer that may pre-compiled by an application compiler and/or compiled by the driver 122). It should be noted that in variations, these stages can be implemented using specialized, fixed function or programmable circuitry. The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage may be implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a BVH traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a task]" is used, this means that the hardware and/or software that implements the ray tracing pipeline 300 does that task.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects within the scene, and tests the ray against triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 may "reject" a hit is when at least a portion of a triangle that the acceleration structure traversal stage 304 reports as being hit is fully transparent. Because the acceleration structure traversal stage 304 only tests geometry, and not transparency, the any hit shader 306 that is invoked due to an intersection with a triangle having at least some transparency may determine that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that the shader programs defined for the closest hit shader 310 and miss shader 312 may implement a wide variety of techniques for coloring ray and/or performing other operations.

A typical way in which ray generation shaders 302 generate rays is with a technique referred to as backwards ray tracing. In backwards ray tracing, the ray generation shader 302 generates a ray having an origin at the point of the camera (i.e., the eye of the viewer). The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray intersects an object is referred to herein as a "ray intersection test." The ray intersection test involves shooting a ray from an origin and determining whether the ray intersects a triangle and, if so, what distance from the origin the triangle intersection is at. For efficiency, the ray tracing test uses a representation of space referred to as a bounding volume hierarchy. This BVH is the "acceleration structure" referred to elsewhere herein. In a BVH, each non-leaf node represents an AABB that bounds the geometry of all children of that node. In an example, the base node represents the maximal extents of an entire region for which the ray intersection test is being performed. In this example, the base node has two children that each represent mutually exclusive AABBs that subdivide the entire region. Each of those two children has two child nodes that represent AABBs that subdivide the space of their parents, and so on. Leaf nodes represent a triangle or other geometry against which a ray intersection test can be performed.

The BVH data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against AABBs, followed by tests against triangles.

Figure 4:
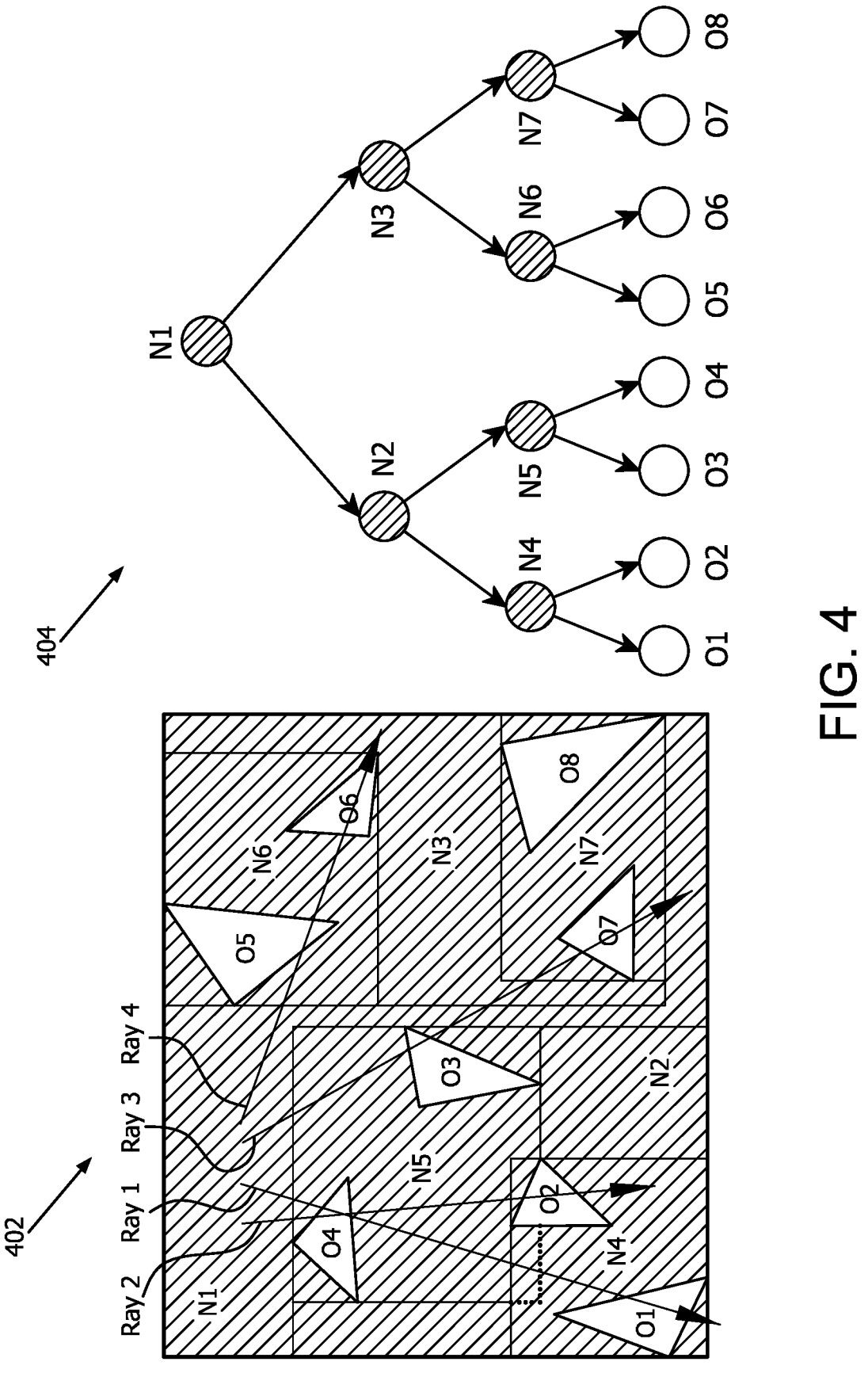
FIG. 4 is an illustration of a bounding volume hierarchy, according to an example.

FIG. 4 is an illustration of a BVH, according to an example. For simplicity, the hierarchy is shown in 2 dimensions. However, extension to 3 dimensions is simple, and it should be understood that the tests described herein would generally be performed in 3 dimensions.

The spatial representation 402 of the BVH is illustrated in the left side of FIG. 4 and the tree representation 404 of the BVH is illustrated in the right side of FIG. 4. The non-leaf nodes are represented with the letter "N" and the leaf nodes are represented with the letter "O" in both the spatial representation 402 and the tree representation 404.

For simplified explanation purposes, triangles are shown as the primitives in the example shown in FIG. 4. As described in more detail below, however, primitives can include capsules and capsule chains for rendering curves in a scene and nodes of a BVH tree can include the capsules.

A conventional ray intersection test for tree representation 404 would be performed by traversing through the tree 404, and, for each non-leaf node tested, eliminating branches below that node if the test for that non-leaf node fails. However, when a ray intersects an AABB (i.e., if the test for a non-leaf node succeeds), conventional ray traversal algorithms will continue traversal within the AABB until the test reaches a leaf node. For example, if the ray intersects $O_5$ but no other triangle, the conventional ray intersection test would test against $N_1$, determining that a ray intersects an AABB (i.e., the test succeeds for $N_1$). The test would test against $N_2$, determining that the test fails (since $O_5$ is not within $N_2$) and the test would eliminate all sub-nodes of $N_2$. Because the test against $N_1$ resulted in a determination that the ray intersected an AABB, traversal would continue to the child nodes of $N_1$, and would test against $N_3$, determining that a ray intersects an AABB (i.e., the test succeeds). Because the test against $N_3$ resulted in a determination that the ray intersected an AABB, traversal would again continue to the child nodes of $N_3$, and would test $N_6$ and $N_7$, determining that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

The ray tracing pipeline 300 casts rays to detect whether the rays hit triangles and how such hits should be shaded (e.g., how to calculate levels of brightness and color of pixels representing objects) during the rendering of a 3D scene. Each triangle is assigned a material, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader or an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, a ray tracing pipeline 300 typically traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of typical ray tracing pipeline 300 is now discussed with respect to the example rays 1-4 illustrated in FIG. 4. For each of the example rays 1-4, the ray tracing pipeline 300 determines which triangles (or other primitives, such as capsules as described in more detail below) those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

In an example, for ray 1, the ray racing pipeline 300 runs the closest hit shader for O4 unless that triangle had an any hit shader or intersection shader that, when executed, indicated that ray 1 did not hit that triangle. In that situation, the ray tracing pipeline 300 would run the closest hit shader for O1 unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with O2 and O4, executes an any hit and/or an intersection shader for those triangles if specified by the material, and runs the appropriate closest hit or miss shader. For rays 3 and 4, the ray tracing pipeline 300 determines intersections as shown (ray 3 intersects O3 and O7 and ray 4 intersects O5 and O6), executes appropriate any hit and an/or intersection shaders, and executes appropriate closest hit or miss shaders based on the results of the any hit and/or intersection shaders.

FIG. 5 is a flow diagram illustrating an example method 500 of compressing geometry for rendering objects of a scene using ray tracing according to features of the present disclosure. The method 500 is described using FIGS. 6A-6C and FIGS. 7A-7C. The functions described at each of the blocks of method 500 can be performed using an accelerated processor (e.g., APD 116) or by fixed function hardware circuitry configured to perform a specific function (e.g., the function at block 508 described below can be performed using fixed function hardware circuitry configured to compute points on curved surfaces).

Figures 6A, 6B, 6C, 6D:
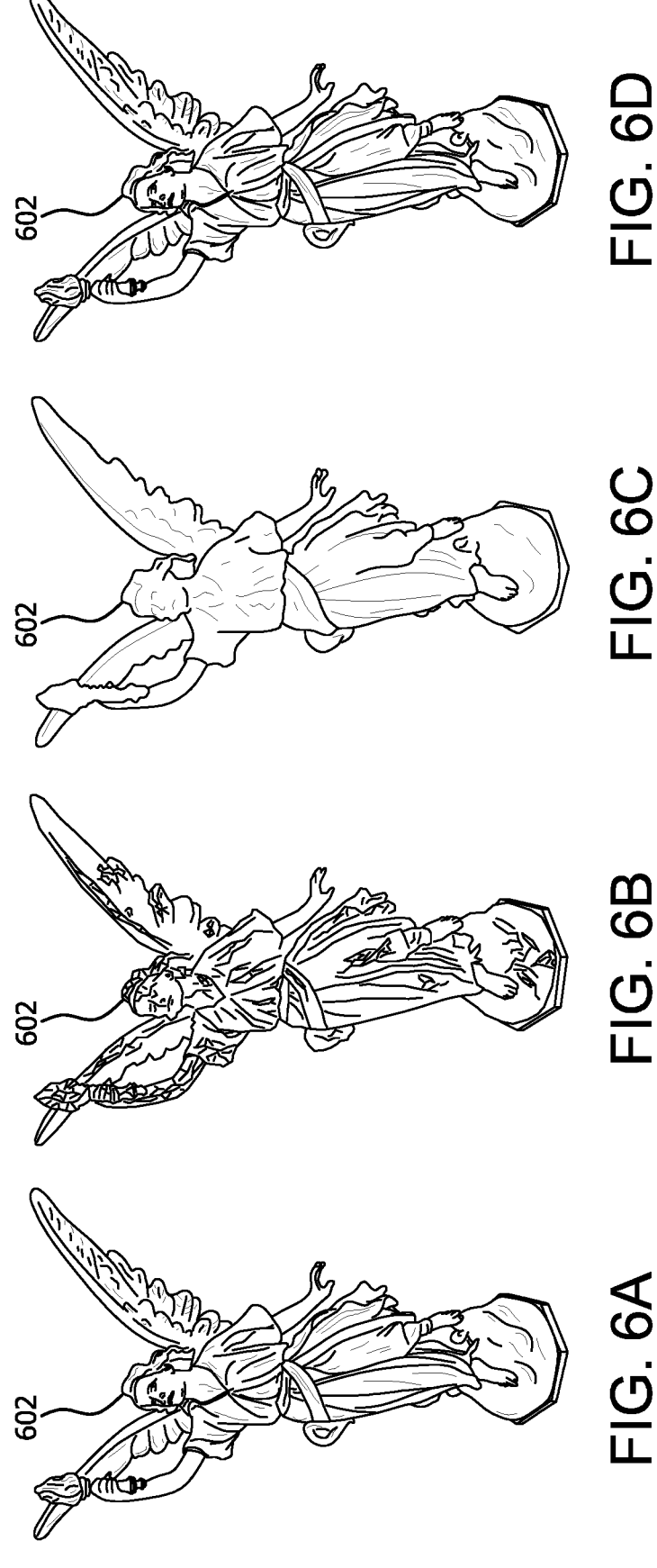
FIG. 6A illustrates an example object, represented by a high resolution mesh, to be rendered according to features of the present disclosure.
FIG. 6B illustrates the example object shown in FIG. 6A, represented by a low resolution version of the high resolution mesh according to features of the present disclosure.
FIG. 6C illustrates the example object shown in FIG. 6B, which is represented using curved surface patches of the low resolution version of the high resolution mesh according to features of the present disclosure.
FIG. 6D illustrates the example object 602 represented by an approximation of the high resolution mesh used to represent the example object shown in FIG. 6A according to features of the present disclosure.

As shown at block 502, the method 500 includes generating a high resolution mesh comprising a plurality of triangles representing objects in the scene. For example, FIG. 6A illustrates an example object 602, represented by a high resolution mesh (e.g., high resolution mesh comprising triangles), to be rendered according to features of the present disclosure.

As shown at block 504, the method 500 includes generating a low resolution version (i.e., low resolution mesh) of the high resolution mesh. Operations to collapse edges of triangles of the high resolution mesh are used to reduce the number of triangles of the high resolution mesh to represent the high resolution mesh as a low resolution mesh having a smaller number of triangles than the high resolution mesh such that the low resolution mesh is a less detailed version of the high resolution mesh. For example, FIG. 6B illustrates the example object 602 shown in FIG. 6A, represented by a low resolution version of the high resolution mesh. That is, operations are performed to collapse edges of triangles of the high resolution mesh (illustrated in FIG. 6A as representing the object 602) to generate the low resolution mesh (illustrated in FIG. 6A as representing the object 602) as a less detailed version (e.g., using a smaller number of triangles) than the high resolution mesh. Because the low resolution mesh includes a smaller number of triangles than the high resolution mesh, less connectivity data (e.g., vertex data of the triangles) is used (e.g., stored in memory) to represent the triangles of the BVH structure.

Figures 7A, 7B, 7C:
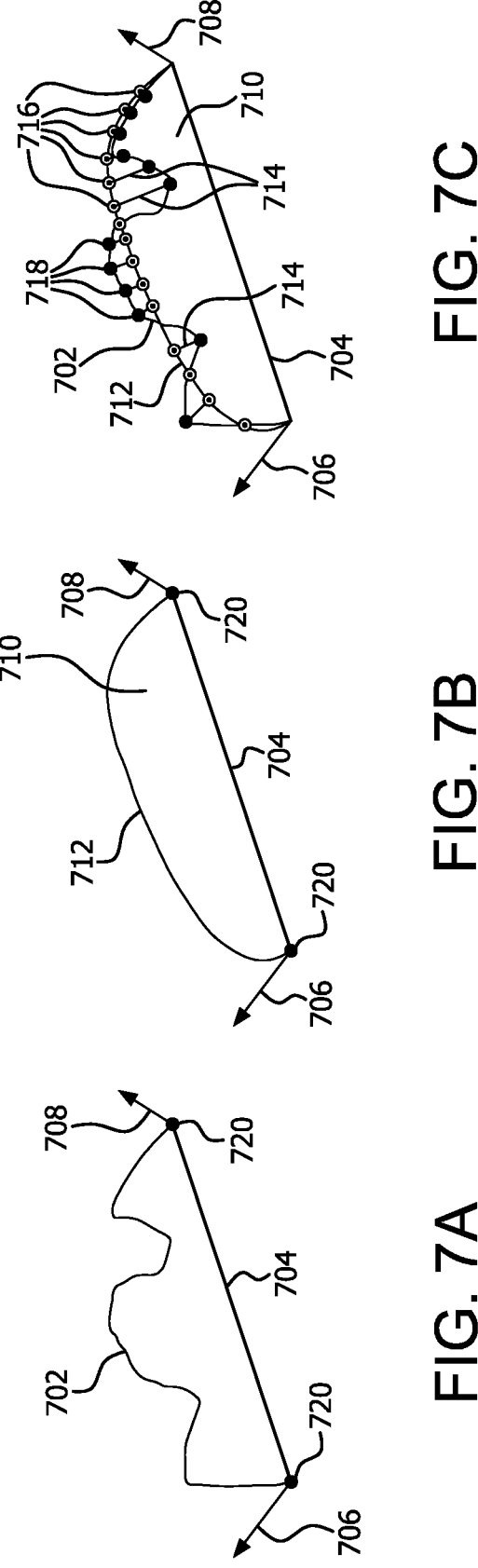
FIG. 7A is an illustration of a surface of a high resolution mesh and an edge of a triangle of a low resolution version of the high resolution mesh according to an example.
FIG. 7B is an illustration of a curved surface of a triangular curved surface patch extending between vertices of the base surface, according to an example.
FIG. 7C is an illustration of interpolated normals extending between points on the curved surface of the triangular surface patch and the surface of the high resolution mesh, according to an example.

Blocks 506 to 510 of method 500 are described using the example illustrations shown in FIGS. 7A-7C. FIGS. 7A-7C are illustrations showing an example of encoding 1D offsets according to features of the present disclosure. FIG. 7A is an illustration of a surface (e.g., slice) 702 of a high resolution mesh (e.g., surface representing a plurality of triangles of a high resolution mesh) and an edge 704 of a triangle (e.g., one of triangles O1-O8 in FIG. 4) of a low resolution version (i.e., low resolution mesh) of the high resolution mesh. For simplified explanation purposes, only a single edge 704 of a triangle of the low resolution mesh is shown in FIGS. 7A-7C. The arrows 706 and 708 are 2D representations of 3D vertex normals at the vertices 720 of the edge 704. FIG. 7B is an illustration of a triangular surface patch 710, having a curved surface 712 (i.e., triangular curved surface patch) extending between the vertices 720 of the edge 704. FIG. 7C is an illustration of interpolated normals 714 (i.e., surface normals) extending between points 716 on the curved surface 712 of the triangular surface patch 710 and the surface 702 (e.g., slice representing one or more triangles) of the high resolution mesh. The shapes, sizes and dimensions of the features shown in FIG. 7A are merely an example.

As shown at block 506, the method 500 includes generating, for each triangle of the low resolution mesh, a triangular curved surface patch. The surface of a triangular curved surface patch depends on the positions of a corresponding triangle of the low resolution mesh and its normals (e.g., quantized normals). For example, as shown in FIG. 7B, the triangular curved surface patch 710 is generated for a triangle of the low resolution mesh. As shown, the curved surface 712 of the triangular curved surface patch 710 extends between vertices 720 of the edge 704. FIG. 6C illustrates the example object 602 represented using curved surface patches of the low resolution version of the high resolution mesh.

The curved surfaces can be generated using various high order surface techniques (e.g., techniques which are implemented using Bezier surfaces constructed from Bezier curves), For example, the curved surfaces, such as curved surface 712, can be generated using various curved surface patches with control points that can be derived solely from the vertices and normals at the vertices of a triangle or bi-linear quadrangle of the low resolution mesh.

As shown at block 508, the method 500 includes determining, for each of a plurality of points (e.g., locations in a space) on the curved surface of the triangular curved surface patch, an interpolated normal (i.e., a line perpendicular to the curved surface). For example, as shown in FIG. 7C, interpolated normals 714 are determined for each point 716 (e.g., location) on the curved surface 712 of the triangular curved surface patch 710. The interpolated normals are, for example, quantized normals which are determined by a combination of the three normals of one of the facets of a corresponding triangle of the low resolution mesh. Interpolated normals are determined at points on the curved surface of the triangular curved surface patch by interpolating normals of the low resolution mesh. Each interpolated normal defines a direction at a corresponding point on the curved surface for a corresponding triangle.

For example, an interpolated normal of a point 716 (e.g., location in a space) on the curved surface 712 between vertices 720 is determined by (1) calculating a vertex normal at each of the three vertices of a corresponding triangle (e.g., the vertex normal are generated by calculating an average of the surface normals of the adjacent facets which share a corresponding vertex) of the low resolution mesh; (2) interpolating (e.g., linear, quadratic, or cubic normal interpolation) the three vertex normals by weighting each vertex normal by its corresponding barycentric coordinate; and (3)

summing the interpolated vertex normals. Examples of two of the three vertex normals of a facet of a triangle of the low resolution mesh are shown in FIGS. 7A-7C as vertex normal 706 and vertex normal 708.

The number of points on each triangular curved surface patch is determined, for example, by a factor in which the number of triangles was reduced from the high resolution mesh to the low resolution mesh. For example, if there is one triangle in the low resolution mesh for every 1000 triangles in the high resolution mesh, an interpolated normal is determined at 1000 points on the curved surfaces of the triangular curved surface patches.

As shown at block 510, the method 500 includes determining, for each point on the curved surface, an offset (i.e., offset value) representing a distance from a point on the curved surface to a surface point of the high resolution mesh. That is, for each point on the curved surface, a 1D offset (e.g., a distance) value is determined between a corresponding point on the triangular curved surface patch and a surface point of a triangle of the high resolution mesh. The offset for each point is determined by casting a ray from the point on the triangular curved surface patch along a corresponding interpolated normal. The 1D offsets are stored and later used to render the objects in the scene.

For example, for each point 716 on the curved surface 712 shown in FIG. 7C, an offset value is determined for representing a distance between a corresponding point 716 on the curved surface 712 and the surface (e.g., slice) 702 of the high resolution mesh. Each offset value is determined by casting a ray, from a point 716 along an interpolated normal 714 and calculating a distance between the point 716 and a point 718 of intersection of the surface (e.g., slice) 702 of the high resolution mesh. In one example, rays are cast in both a first direction (in one dimension) and in a second direction (in the one dimension), opposite the first direction to find the closest point on the high resolution surface. Alternatively, a ray is cast in the first direction, but not the second direction when the ray intersects the surface 702 in the first direction and is cast in the second direction when the ray does not intersect the surface 702 in the first direction. The 1D offset values are then stored in memory (e.g., memory of a GPU) and later used to render the objects in the scene.

As shown at block 512, the method 500 includes generating a ray tracing acceleration structure (e.g., BVH) comprising the triangles of the low resolution mesh and their 1D offsets (e.g., the data representing the triangles of the low resolution mesh). For example, the tree representation 404 of the BVH illustrated in the right side of FIG. 4 is generated for triangles O1 to O8 of the portion of the low resolution mesh.

The operations at blocks 502 to 510 to determine the offset values are, for example, performed as a preprocessing step (e.g., offline) prior to rendering objects in the scene. That is, the operations at blocks 502 to 510 are not performed for rendering objects in each frame but rather are performed (e.g., at runtime) as a single preprocessing step prior to rendering frames of a scene. As shown at block 514, the method 500 includes rendering the objects in the scene.

Figure 8:
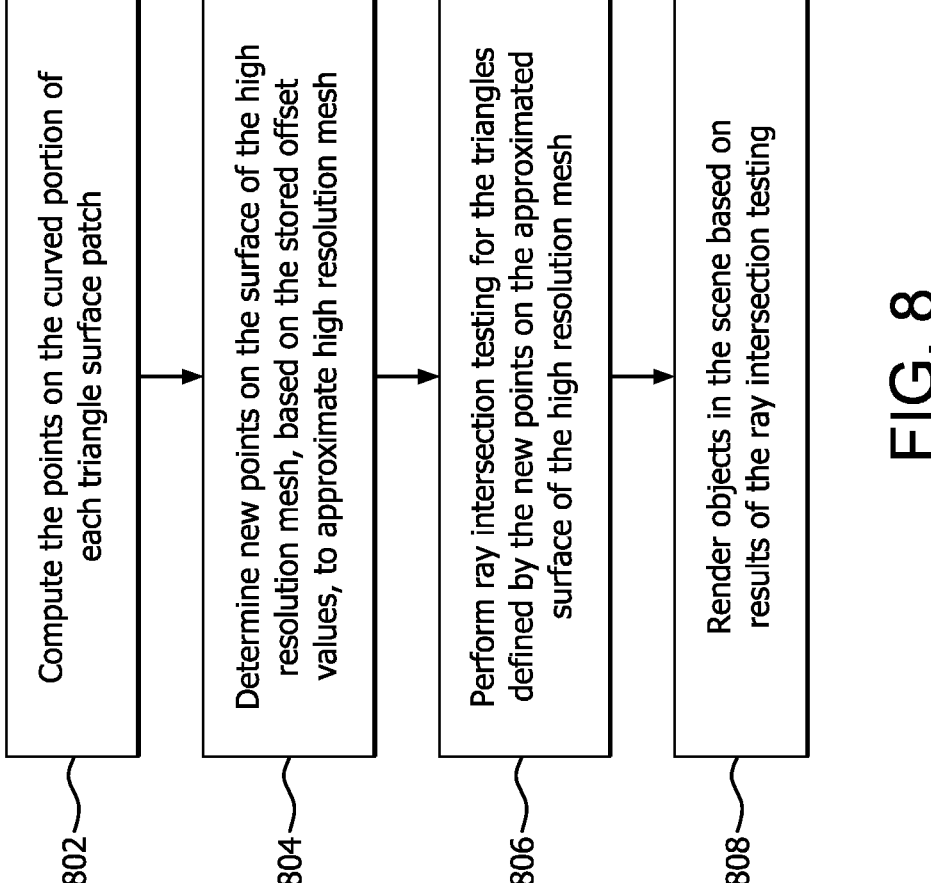
FIG. 8 is a flow diagram illustrating an example method of rendering objects in the scene using ray tracing.

FIG. 8 is a flow diagram illustrating an example method 800 of rendering objects in the scene (as indicated at block 514 of FIG. 5) using ray tracing.

As shown at block 802, the method 800 includes computing the points on the curved portion of each triangular curved surface patch used to determine the interpolated normals at block 508 during preprocessing. For example, the points 716 are computed on the curved portion 712 of triangular curved surface patch 710. As described above, the number of points on each triangular curved surface patch is determined, for example, by a factor in which the number of triangles was reduced from the high resolution mesh to the low resolution mesh.

As shown at block 804, the method 800 includes determining new points, on the surface of the high resolution mesh, at which to cast rays (e.g., 3D new points approximating the surface of the high resolution mesh). That is, the new points, which are used to approximate the surface of the high resolution mesh, are calculated by moving, from a point on the curved surface of the triangular surface patch, along a corresponding interpolated normal until the offset value (i.e., distance) is reached. For example, the surface of the high resolution mesh (e.g., surface of a triangle) is approximated from the new points 718 on the surface 702 of the high resolution mesh. Each new point 718 is determined by moving from a point 716 along the interpolated normal 714 by the corresponding stored 1D offset value determined at block 510.

FIG. 6D illustrates the object 602 represented by an approximated high resolution mesh surface (e.g., approximated surfaces of the triangles of the high resolution mesh representing the object 602 in FIG. 6A).

As shown at block 806, the method 800 includes performing ray intersection testing by casting rays toward the triangles of the high resolution mesh, the surfaces of which are approximated using the new points determined by the offsets from the points on the curved surface patch. For example, rays are cast toward triangles of the approximated high resolution mesh surface shown in FIG. 6D used to represent object 602.

During ray intersection testing, a ray is cast toward a triangle whose surface is approximated using the new points 718 shown in FIG. 7C and a determination is made as to whether the triangle (representing an object or a portion of an object) of the approximated high resolution mesh is "hit" by the cast ray. That is, the approximated high resolution mesh is resampled at the new points determined by the offsets in a direction along the interpolated normals from the points on the curved surface of each triangular curved surface patch.

Ray traversal proceeds as described above using, for example, the ray tracing acceleration structure (e.g., BVH) generated at block 512.

As shown at block 808, the objects in the scene are rendered based on the ray intersection testing performed at block 806. For example, the objects in the scene are rendered for display on a display device (e.g., display device 118).

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for rendering objects in a scene using ray tracing, the method comprising:

generating a low resolution version of a high resolution mesh representing objects in the scene;

for each polygon of the low resolution version, generating a curved surface patch parameterized by patch local coordinates;

storing, for each of a plurality of patch local coordinates corresponding to respective points on the curved surface patch, a signed scalar offset equal to a distance from the respective point on the curved surface patch to a surface of the high resolution mesh measured along a corresponding interpolated normal;

reconstructing new points by adding the stored signed scalar offsets along the corresponding interpolated normals to the corresponding points on the curved surface patches and forming triangles whose vertices are the new points;

performing ray intersection testing against the triangles formed by the new points; and rendering the objects in the scene based on the ray intersection testing.

2. The method of claim 1, wherein each signed scalar offset equals a one-dimensional distance measured along the interpolated normal from a point on a curved surface of a curved surface patch to a first intersection with a surface of the high resolution mesh.

3. The method of claim 2, wherein the signed scalar offsets are stored prior to rendering the objects in the scene, and the surface of the high resolution mesh is approximated by moving from the point on the curved surface of the curved surface patch, along a corresponding interpolated normal, until the distance defined by the signed scalar offset is reached to obtain a new point.

4. The method of claim 1, wherein the curved surface patches comprise at least one of triangular curved surface patches each defined for a corresponding triangle and quadrangular curved surface patches each defined for a corresponding bi-linear quadrangle of the low resolution version of the high resolution mesh, and wherein each interpolated normal is determined by interpolating a combination of three vertex normals of the corresponding triangle or a combination of four vertex normals of the corresponding bi-linear quadrangle of the low resolution version of the high resolution mesh.

5. The method of claim 1, wherein the curved surface patches comprise at least one of triangular curved surface patches each defined for a corresponding triangle and quadrangular curved surface patches each defined for a corresponding bi-linear quadrangle of the low resolution version of the high resolution mesh, the high resolution mesh comprises at least one of a first number of triangles and a first number of bi-linear quadrangles representing objects in the scene, the low resolution version of the high resolution mesh comprises at least one of a second number of triangles and a second number of bi-linear quadrangles representing the objects in the scene, and the first number of triangles is greater than the second number of triangles.

6. The method of claim 1, wherein rendering the objects in the scene comprises rendering objects for a plurality of frames, and the signed scalar offsets are determined for the plurality of frames prior to rendering any frame.

7. A method for compressing geometry for rendering objects in a scene using ray tracing, the method comprising:

generating a low resolution version of a high resolution mesh comprising at least one of triangles and bi-linear quadrangles representing objects in the scene;

for each polygon of the low resolution version of the high resolution mesh:

generating a curved surface patch parameterized by patch-local coordinates, determining interpolated normals, at a plurality of points on the curved surface patch corresponding to a plurality of patch-local coordinates, by interpolating vertex normals of the low resolution mesh, and storing, for each of the plurality of patch-local coordinates, a signed scalar offset equal to a distance from the corresponding point on the curved surface patch to a surface of the high resolution mesh measured along a corresponding interpolated normal; and rendering objects in the scene, using a ray tracing acceleration structure, by reconstructing new points by adding the stored signed scalar offsets along the corresponding interpolated normals to the corresponding points on the curved surface patches, forming triangles whose vertices are the displaced points, and performing ray intersection testing.

8. The method of claim 7, wherein, for each curved surface patch, the interpolated normals are determined by interpolating vertex normals of the polygon of the low resolution mesh without evaluating geometry of neighboring polygons of the low resolution mesh.

9. The method of claim 7, wherein the curved surface patch comprises at least one of a triangular curved surface patch defined for a corresponding triangle and a quadrangular curved surface patch defined for a corresponding bi-linear quadrangle of the low resolution version of the high resolution mesh, and wherein each interpolated normal is determined by interpolating a combination of three vertex normals of the corresponding triangle or a combination of four vertex normals of the corresponding bi-linear quadrangle of the low resolution version of the high resolution mesh.

10. The method of claim 7, wherein a number of points on the curved surface of the curved surface patch is selected based on a reduction factor by which a number of polygons in the low resolution version is less than a number of polygons in the high resolution mesh.

11. The method of claim 7, wherein each signed scalar offset is encoded as a one dimensional distance measured along the interpolated normal from a point on the curved surface patch to a surface of the high resolution mesh.

12. The method of claim 7, wherein determining each signed scalar offset comprises casting a ray from a point on the curved surface patch along the interpolated normal and setting the signed scalar offset equal to a distance along the ray to a first intersection with a surface of the high resolution mesh.

13. The method of claim 12, wherein determining the signed scalar offset comprises casting a first ray from the point on the curved surface-patch in a direction of the interpolated normal and, if that does not yield a smaller-magnitude distance, casting a second ray from the point in a direction opposite the interpolated normal, and selecting the smaller magnitude distance with a sign corresponding to a chosen direction.

14. The method of claim 12, wherein determining the signed scalar offset comprises:

casting a first ray from the point on the curved surface patch in a direction of the interpolated normal and in response to the first ray intersecting the surface of the high resolution mesh, stopping ray casting from the point, and in response to the first ray not intersecting the surface of the high resolution mesh, casting a second ray from the point in a direction opposite the interpolated normal.

15. A processing device for rendering objects in a scene using ray tracing, the processing device comprising:

memory; and one or more processors communicatively coupled to the memory, wherein the one or more processors are collectively configured to:

generate a low resolution version of a high resolution mesh representing objects in the scene, for each polygon of the low resolution;

version, generate a curved surface patch parameterized by patch local coordinates, determine interpolated normals at a plurality of points on the curved surface patch corresponding to a plurality of patch local coordinates by interpolating vertex normals of the low resolution version, store, in the memory and for each of the plurality of patch local coordinates, a signed scalar offset equal to a distance from the corresponding point on the curved surface patch to a surface of the high resolution mesh measured along a corresponding interpolated normal, reconstruct new points by adding the stored signed scalar offsets along the corresponding interpolated normals to the corresponding points on the curved surface patches and form triangles whose vertices are the new points, perform ray intersection testing against the triangles formed by the new points, and render the objects in the scene based on the ray intersection testing.

16. The processing device of claim 15, wherein each signed scalar offset equals a one-dimensional distance measured along a corresponding interpolated normal from a point on a curved surface of a curved surface patch to a surface of the high-resolution mesh.

17. The processing device of claim 16, wherein the signed scalar offsets are stored in the memory prior to rendering, and the surface of the high-resolution mesh is approximated by moving from the point on the curved surface of the curved surface patch along the corresponding interpolated normal until the distance defined by the signed scalar offset is reached to obtain a new point.

18. The processing device of claim 15, wherein the curved surface patches comprise at least one of triangular curved surface patches each defined for a corresponding triangle and quadrangular curved surface patches each defined for a corresponding bi-linear quadrangle of the low resolution version of the high resolution mesh, and wherein each interpolated normal is determined by interpolating a combination of three vertex normals of the corresponding triangle or a combination of four vertex normals of the corresponding bi-linear quadrangle of the low resolution version of the high resolution mesh.

19. The processing device of claim 15, wherein the curved surface patches comprise at least one of triangular curved surface patches each defined for a corresponding triangle and quadrangular curved surface patches each defined for a corresponding bi-linear quadrangle of the low resolution version of the high resolution mesh, the high resolution mesh comprises at least one of a first number of triangles and a first number of bi-linear quadrangles representing objects in the scene, the low resolution version of the high resolution mesh comprises at least one of a second number of triangles and a second number of bi-linear quadrangles representing the objects in the scene, and the first number of triangles is greater than the second number of triangles.

20. The processing device of claim 15, further comprising a display device, wherein the objects in the scene are rendered for display on the display device.

\* \* \* \* \*